US00RE39367E

(19) United States
(12) Reissued Patent
Machida

(10) Patent Number: US RE39,367 E
(45) Date of Reissued Patent: Oct. 31, 2006

(54) METHOD FOR ENCODING AND DECODING MOVING PICTURE SIGNALS

(75) Inventor: Yutaka Machida, Yokohama (JP)

(73) Assignee: Matsushita Electric Industrial Co., Ltd., Osaka (JP)

(21) Appl. No.: 10/662,949

(22) Filed: Sep. 16, 2003

Related U.S. Patent Documents

Reissue of:
(64) Patent No.: 5,937,095
Issued: Aug. 10, 1999
Appl. No.: 08/594,565
Filed: Jan. 31, 1996

U.S. Applications:
(63) Continuation of application No. 09/925,423, filed on Aug. 10, 2001.

(30) Foreign Application Priority Data

Jan. 31, 1995 (JP) ..... 7-014514

(51) Int. Cl.
*G06K 9/36* (2006.01)

(52) U.S. Cl. ..... 382/233; 382/232
(58) Field of Classification Search ..... 382/232, 382/233, 236, 248, 250; 348/394.3–396.1, 348/400.1, 402.1, 403.1, 407.1, 409.1, 412.1, 348/413.1–416.1, 420.1, 421.1, 430.1, 431.1
See application file for complete search history.

(56) References Cited

U.S. PATENT DOCUMENTS

| | | | | | |
|---|---|---|---|---|---|
| 5,023,710 | A | * | 6/1991 | Kondo et al. | 375/240.24 |
| 5,060,285 | A | * | 10/1991 | Dixit et al. | 382/253 |
| 5,107,345 | A | * | 4/1992 | Lee | 382/250 |
| 5,138,447 | A | * | 8/1992 | Shen et al. | 375/240.12 |
| 5,144,424 | A | * | 9/1992 | Savatier | 375/240.03 |
| 5,173,952 | A | * | 12/1992 | Sugahara et al. | 382/268 |
| 5,203,715 | A | * | 4/1993 | Owada et al. | 348/421 |
| 5,231,384 | A | * | 7/1993 | Kuriacose | 348/426.1 |
| 5,287,178 | A | * | 2/1994 | Acampora et al. | 348/384.1 |
| 5,397,095 | A | * | 3/1995 | Jeffrey | 249/28 |
| 5,557,331 | A | | 9/1996 | Honjo | |

FOREIGN PATENT DOCUMENTS

| | | | |
|---|---|---|---|
| EP | 055049 | * | 7/1993 |
| GB | 2287603 | * | 9/1995 |
| JP | 2-272851 | | 11/1990 |
| JP | 7-15729 | | 1/1995 |
| JP | 7-111651 | | 4/1995 |

OTHER PUBLICATIONS

"Codec for AFdiovisual Services AT n×384kbits/s" Cornite Consultatif International Telegraphique Telefonique Recommendation, vol. 3, No. iii.06, Nov. 14, 1998, pp. 120–128, XP000575342.*

"Transmission of Non–Telephone Signals. Information Technology–Generic Coding of Moving Pictures and Associated Audio Information: Video" ITU–T Telecommunication Standarization Sector of ITU, Jul. 1995, pp. A/B, I–VIII, 1–201, XP000198491.*

Line Transmission of Non–Telephone Signals, International Telecommunication Union, ITU–T Tecommendation H.261, Mar. 1993, pp. 1–25.*

* cited by examiner

*Primary Examiner*—Jose L. Couso
(74) *Attorney, Agent, or Firm*—Clark & Brody

(57) ABSTRACT

A method for encoding and decoding digital moving picture signals which can decode subframes appropriately in relation to time if a part of a bit stream is missing or an error occurs in the bit stream, and can suppress degradation of a reproduced picture if decoding of a subframe including a picture in motion in relation to time becomes unfeasible. In the method for encoding and decoding digital moving picture signals of this invention, information for one frame is encoded correspondingly to a spatial hierarchy of a frame, subframes and blocks. A subframe time position number and a subframe space number are attached to an identifier of each of the subframe, thereby resuming appropriate decoding of the subframes immediately after a trouble if an error occurs. The subframe identifiers are placed at a certain interval in the bit stream so as to give a smaller size to a subframe including a block which is in motion and difficult to be encoded, thereby suppressing degradation of a reproduced picture if decoding of the subframe becomes unfeasible.

5 Claims, 7 Drawing Sheets

METHOD FOR ENCODING AND DECODING MOVING PICTURE SIGNALS

Matter enclosed in heavy brackets [ ] appears in the original patent but forms no part of this reissue specification; matter printed in italics indicates the additions made by reissue.

*This application is a continuation of Reissue Application Ser. No. 09/925,423, filed Aug. 10, 2001.*

*Notice: more than one reissue application has been filed for the reissue of U.S. Pat. No. 5,937,095. The reissue applications are the present reissue application Ser. No. 10/662,949 filed on Sep. 16, 2003, and related reissue application Ser. Nos., 11/108,884 filed on Apr. 19, 2005, 11/108,883 filed on Apr. 19, 2005 and 11/108,885 filed on Apr. 19, 2005, and the original reissue application Ser. No. 09/925,423, filed Aug. 10, 2001, now U.S. Pat. No. Re. 38,726. The present reissue application and the related reissue applications are all continuation applications of application Ser. No. 09/925,423.*

BACKGROUND OF THE INVENTION (1) Field of the Invention

The present invention relates to a method for encoding and decoding digital moving picture signals for use in TV phones, TV conferences and the like.

(2) Description of the Prior Art

In a general method for encoding digital moving picture signals, a frame of inputted moving picture is divided into plural blocks each composed of N×M pixels, and processes of motion detection, prediction, orthogonal transform, quantization, variable length coding, etc. are conducted on each block.

In a general method for decoding digital motion picture signals, blocks each composed of N×M pixels are regenerated in a reverse [procdyre] *procedure*, that is, processes of variable length decoding, reverse quantization, reverse orthogonal transform, motion compensation, etc.

The above general encoding method and decoding method for encoding and decoding digital moving picture signals enable removal of redundancy contained in moving picture signals, and efficient communication and storage of a moving picture with less information.

In the general encoding method and decoding method for encoding and decoding digital moving picture signals, the processes are conducted on each pixel block, as stated above. It is general that a set of pixel blocks forms a subframe and a set of subframes forms a frame, which are units processed in the general encoding and decoding method.

Hereinafter, encoding and decoding of each block, subframe and frame will be described by way of an example of a general encoding and decoding method for encoding and decoding digital moving picture signals with reference to ITU-T Recommendation H.261 (hereinafter, referred simply H.261) made on March, 1993.

H.261 defines an encoding method and a decoding method for encoding and decoding luminance signals and color difference signals, separately, of digital moving picture signals. However, description will be made of only the luminance signals, for the sake of convenience. Basically, the encoding method and decoding method for encoding and decoding the luminance signals are not different from those for the color difference signals.

As shown in FIG. 1, one frame 101 of digital moving picture signals is composed of 352×288 pixels according to H.261. The frame 101 is divided into twelve subframes 102 called GOBs (Group of Blocks) each composed of 176×48 pixels (hereinafter, the subframe in the description of the prior art will be referred a GOB). Further, the GOB 102 (subframe) is divided into thirty three blocks 103 called macro blocks each composed of 16×16 pixels.

The encoding method according to H.261 defines that encoded information for one frame is corresponded to a spatial hierarchical structure such as the frame 101, GOBs 102 and macro blocks 103 described above, as shown in FIG. 2.

In FIG. 2, a part enclosed in a rectangle shows encoded information, and the number of coding bits is shown under each of the rectangles. In FIG. 2, arrows show linkages of the encoded information. A series of encoded moving picture signal sequences as this is called a bit stream 104.

In the bit stream 104 according to H.261 shown in FIG. 2, a part including all encoded information for one macro block 103 is called a macro block layer 103S, a part including all encoded information for one GOB 102 is called a GOB layer 102S, and a part including all encoded information for one frame 101 is called a frame layer 101S.

Meanings of the encoded information in each of the layers shown in FIG 2 are given below:

Frame Layer 101S

PSC (20 bits): a frame identifier 105; a unique code by which an encoding method can be always identified, expressed as "0000 0000 0000 0000 0001";

TR (5 bits): a frame number 106; indicating a time position in which this frame 101 should be displayed;

PTYPE (6 bits): frame type information 107; various information about the frame 101;

PEI (1 bit): extension data insertion information 108; a flag representing presence of following PSPARE 109;

PSPARE (8 bits): extension data; GOB layer 102S (subframe)

GBSC (16 bits): a GOB identifier 110; a unique code by which a decoding method can be always identified, expressed as "0000 0000 0000 0000";

GN (4 bits): a GOB number 111; indicating a spatial position of this GOB 102 within the frame 101;

GQUANT (5 bits): quantization characteristic information 112; indicating a quantization characteristic when a macro block 103 in the GOB 102 is encoded;

GEI (1 bit): extension data insertion information 113; a flag representing presence of following GSPARE 114;

GSPARE (8 bits): extension data 114.

Incidentally, the encoded information 115 of the macro block layer which is the lowest hierarchy in FIG. 2 is generated in the encoding method of motion detection, prediction, orthogonal transform, quantization, variable length coding, etc., as described before, whose coding bit number is not fixed. The number of coding bits of the macro block layer 103S, in general, increases if a spatial level of pixels included in the macro block 103 changes largely or a time level of pixels included in the macro block 103 having the same spatial positions changes largely. Such macro block 103 is, hereinafter, referred a macro block 103 which is difficult to be encoded.

To the contrary, if a level of pixels included in the macro block 103 is steady in relation to space and time, the number of coding bits of the macro block layer 103S remarkably decreases, or sometimes becomes zero. Such macro block 103 is hereinafter referred a macro block 103 which is easy to be encoded.

In the decoding method according to H.261, the PSC 105 which is an identifier of the frame layer 101S is first found out from the bit stream 104. Incidentally, in a state where a decodable code has been successfully found out it is said that synchronization is established. When the PSC 105 is found out from the bit stream and synchronization of the frame layer 101S is established, it can be identified that the bit stream 104 until the next PSC 105 appears is encoded information for one frame. Further, a time position in which the frame 101 composed of 352×288 pixels obtained by decoding the bit stream 104 for that one frame can be obtained by examining the frame number 106 following the PSC 105.

After the establishment of the frame layer, a GBSC 110 that is an identifier of the GOB layer 102S is found out from the following bit stream 104 in the encoding method according to H.261. When synchronization of the GBSC layer is established, it can be identified that the bit stream 104 until the next GBSC 110 appears is encoded information for one GOB 102. Further, a spatial position of the GOB 102 composed of 176×48 pixels obtained by decoding the bit stream 104 for that one GOB 102 in a frame 101, in which the GOB 102 should be placed, can be obtained by examining a GN 111 which is a GOB number following the GBSC 110.

In the decoding method according to H.261, a bit stream 104 of a following macro block layer 103S is decoded after the establishment of the GOB layer 102s. The decoding method of the macro block layer 103S is a procedure to regenerate a macro block 103 composed of 16×16 pixels in processes of variable length decoding, reverse quantization, reverse orthogonal transform, motion compensation, etc., as described before. It should be here noted that the macro block layer 103S has no unique code by which a decoding method can be always identified dissimilarly to the PSC 105 or BGSC 110, and encoded information of each macro block is composed of undefined length bits of a variable length code.

As shown in FIG. 3, in the GOB (subframe) layer 102S, the encoded information from the first macro block 115, to the thirty third macro block $\mathbf{115}_{33}$ is expressed as a series of variable length codes without a unique code. If decoding of the macro block encoded information is initiated from a point indicated by A in FIG. 3, and successively conducted in the order of the first, the second, . . . the nth, . . . the thirty third macro blocks, it is possible to regenerate all the macro blocks 103 in the GOB layer 102S. However, if the decoding of the macro block encoded information is initiated from a point indicated by B or C in FIG. 3, it is impossible to identify a point from which encoded information 115 of one macro block starts, which leads to a failure of establishing synchronization. In which case, the decoding and regenerating all macro blocks 103 become unfeasible until the next GBSC 110 appears. In other words, the GBSC 110 also represents a starting point of decoding the macro block layer 103S.

Finally, in the decoding method according to H.261, the GOB 102 which is a set of regenerated macro blocks 103 is placed in a spatial position within a frame 101 directed by GN 111, and the frame 100 which is a set of the regenerated GOBs 102 is placed in a time position directed by TR 106.

As above, it is possible to decode one frame 101 of digital moving picture correctly in relation to space and time according to H.261.

However, the above general method for encoding and decoding digital moving picture signals has a drawback that if a part of a bit stream 104 [lacks] *is lacking* or an error occurs therein, it might be impossible to accurately decode all subframes (GOBs) 102 in relation to time until synchronization of the next frame layer 101S is established.

The reason of the above is that codes which can be identified at all times in the bit stream 104 are only the PSC 105 which is a frame identifier and the GBSC 110 which is a subframe identifier in the general decoding method. If a part of the bit stream 104 lacks or an error occurs therein, it is impossible to recover synchronization of the decoding until the next GBSC 110 appears so that the decoding becomes unfeasible. Even if the next GBSC 110 appears, the bit stream 104 of that subframe layer 102S cannot be correctly decoded in relation to time. This will be understood from FIG. 4.

FIG. 4 shows an example where the fifth GOB $\mathbf{102}_5$ in the nth frame 101n through the sixth GOB $\mathbf{102}_6$ in the (n+1)th frame [$\mathbf{101}_{n-1}$] $101_{n+1}$ cannot be decoded in relation to time due to [lacks] *lacking portions* or errors of the bit stream 104 occurring in burst. In this example, not only the PSC 105 corresponding to the (n+1)th frame in relation to time but also the following TR 106 are missed or in error. It is therefore possible to correctly decode the GOB $\mathbf{102}_7$ in relation to space by establishing synchronization from the GBSC 110 corresponding to the seventh GOB $\mathbf{102}_7$ in the (n+1)th frame $\mathbf{101}_{n+1}$ in relation to time and decoding the following GN 111, but impossible to specify whether this GOB $\mathbf{102}_7$ positions in the nth frame or in the (n+1)th frame in relation to time.

In terms of decoding of the eighth GOB $\mathbf{102}_8$ through the twelfth GOB $\mathbf{102}_{12}$ in the (n+1)th frame in relation to time, it is impossible to specify whether these GOBs 102 position in the nth frame or in the (n+1)th frame in relation to time.

In consequence, if a part of the bit stream 104 is [missed] *missing* or an error occurs therein, it becomes impossible to correctly decode all GOBs 102 in relation to time until synchronization of the next frame layer $\mathbf{101}_5$ is established.

Further, the general method for encoding and decoding digital moving picture signals has another drawback that if the GOB 102 including a picture in motion in relation to time cannot be decoded, a picture quality of the reproduced picture is largely degraded.

This problem will be described in more detail with reference to FIG. 5. FIG 5 shows one frame including decoded signals of a moving picture, where a figure is moving in the center of the frame. In FIG. 5, a part moving in relation to time is indicated by slanting lines, and the remaining part is a background which is still in relation to time. A scene like this is general in TV conferences, TV telephones or the like.

Referring to FIG. 5, considering that any one of the first GOB $\mathbf{102}_1$ through the fourth GOB $\mathbf{102}_4$ cannot be decoded. The first through fourth GOBs $\mathbf{102}_1$ through $\mathbf{102}_4$ include a picture still in relation to time. If the second GOB $\mathbf{102}_2$ cannot be decoded, for example, a skillful operation is conducted to substitute the second GOB $\mathbf{102}_2$ of the present frame 101 with the second GOB $\mathbf{102}_2$ of the preceding frame $\mathbf{101}_{-1}$ in the decoding. With this operation, degradation of a picture quality in the second GOB $\mathbf{102}_2$ of the present frame 101 may be hardly detected.

However, it is a problem if decoding on the fifth through twelfth GOBs $\mathbf{102}_5$ through $\mathbf{102}_{12}$ shown in FIG. 5 cannot be decoded. The fifth through twelfth [GOSs] *GOBs* $\mathbf{102}_5$ through $\mathbf{102}_{12}$ include a picture moving in relation to time. This means, for example, that a picture in the ninth GOB $\mathbf{102}_9$ of the preceding frame $\mathbf{101}_{-1}$ is largely different from the ninth GOB $\mathbf{102}_9$ of the present frame 101 in relation to time. If the decoding of the ninth GOB $\mathbf{102}_9$ is unfeasible, degradation of the picture quality of the ninth GOB $\mathbf{102}_9$ of the present frame 101 is obviously detected even if the skillful operation mentioned above is conducted in the decoding.

Accordingly, if decoding of GOB 102 including a picture moving in relation to time becomes unfeasible, a quality of a reproduced picture is largely degraded.

SUMMARY OF THE INVENTION

In the light of the above problems, an object of the present invention is to provide a method for encoding and decoding digital moving picture signals, which can appropriately decode subframes (GOBs) following a subframe in trouble in relation to time if a part of a bit stream is missing or an error occurs in the bit stream.

Another object of the present invention is to provide a method for encoding and decoding digital moving picture signals, which can suppress degradation of a reproduced picture to a small extent if decoding of a subframe (GOB) including a picture in motion in relation to time becomes unfeasible.

To accomplish the first object, the present invention is featured in that in the method for encoding and decoding digital moving picture signals of this invention, time position information representing an order of displaying a subframe *is attached* to an identifier of the subframe by which the subframe is identified.

According to the method for encoding and decoding digital moving picture signals of this invention, time position information representing an order of displaying a subframe is attached to an identifier used to identify the subframe and the identifier of the subframe is encoded. It is therefore possible to decode subframes following a subframe in trouble appropriately in relation to time if a part of [bit stream] *a bit stream* is missing or an error occurs in the bit stream by using the time position information representing an order of displaying each of the subframes attached to an identifier used to identify the subframe.

To accomplish the second object, the present invention is featured in that in the method for encoding and decoding digital moving picture signals of this invention, the number of blocks included in a subframe is varied according to a sum of quantities of generated information of the blocks included in the subframe so that each of all the subframes included in the frame has an equal sum of quantities of the generated information of the blocks included in the subframe.

According to the method for encoding and decoding digital moving picture signals of this invention, the number of blocks included in a subframe is varied according to a sum of quantities of generated information of the blocks included in the subframe so that each of all the subframes included in the frame has an equal sum of quantities of the generated information of the blocks included in the subframe. In consequence, a spatial size of each subframe is not fixed. A subframe including a block having a large number of coding bits is in a smaller size, whereas a subframe including a block having a small number of coding bits is in a larger size. It is therefore possible to suppress degradation of a reproduced picture even if decoding of a subframe becomes unfeasible since a subframe including a block which includes a motion in relation to time and is difficult to be encoded is in a smaller size in relation to space.

DESCRIPTION OF THE PREFERRED EMBODIMENTS

Figure 1:
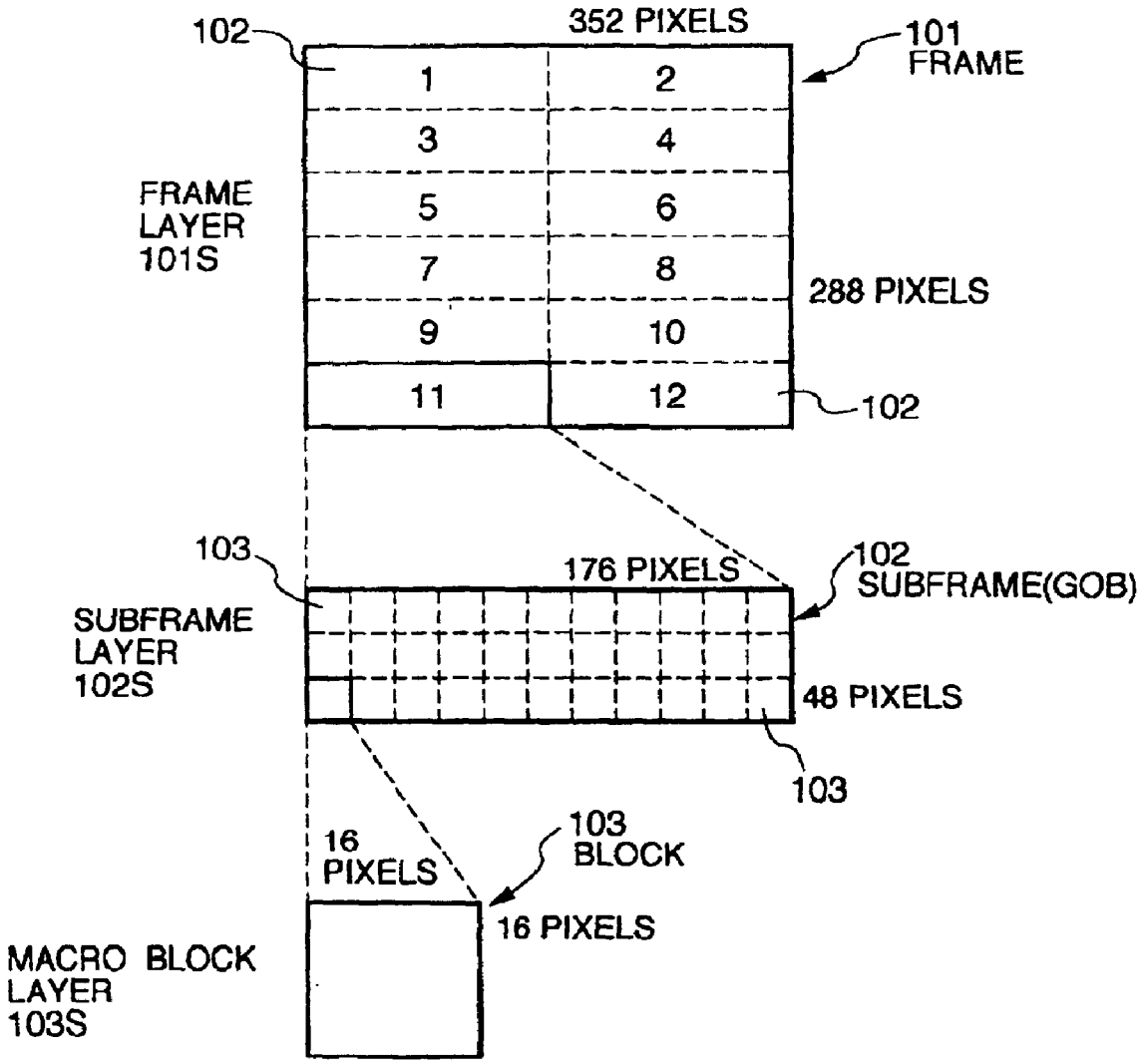
FIG. 1 PRIOR ART
FIG. 1 shows units to be encoded in a general encoding method for encoding moving picture signals.
Figure 2:
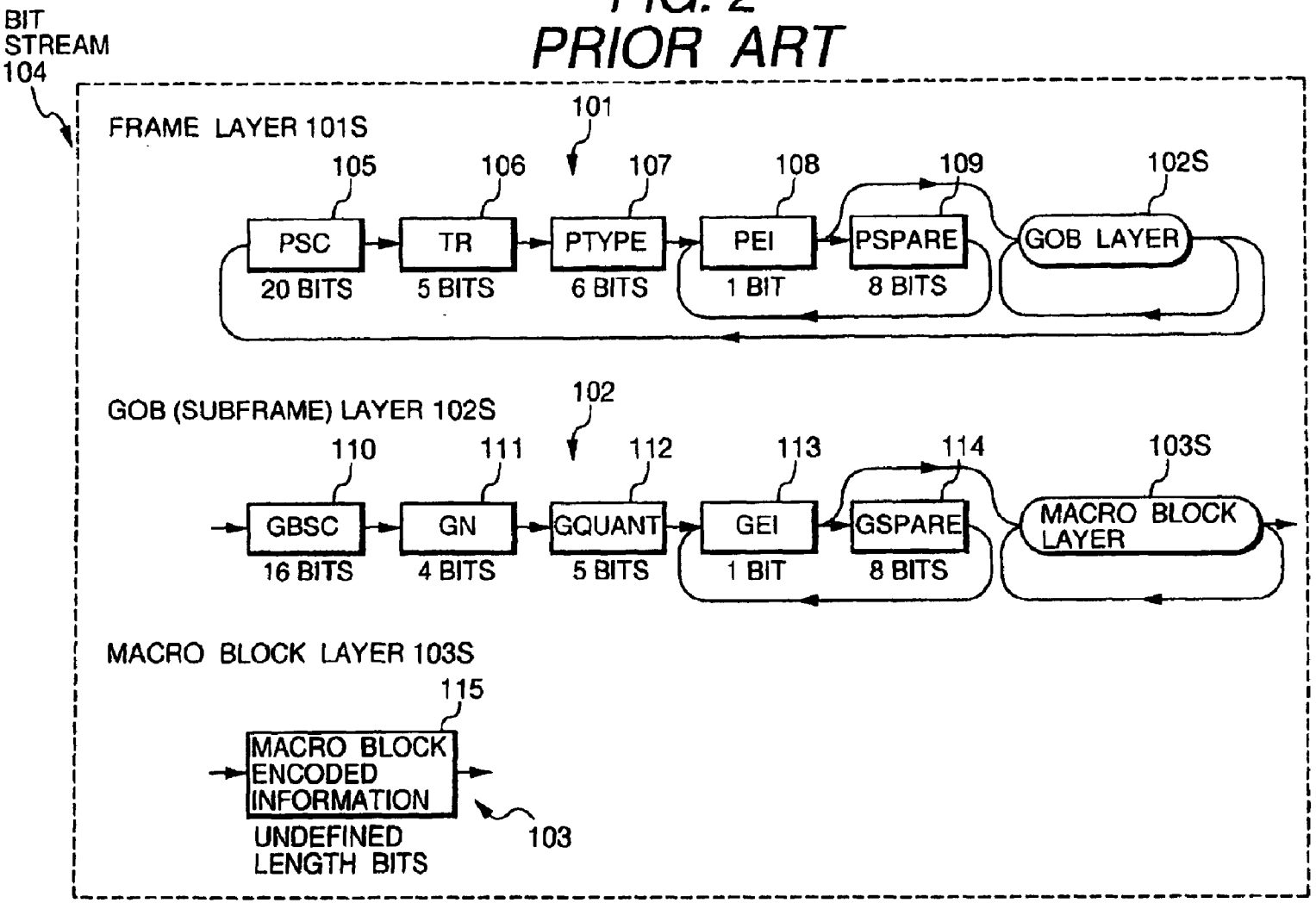
FIG. 2 PRIOR ART
FIG. 2 shows a bit stream generated in the general encoding method for encoding moving picture signals.
Figure 3:
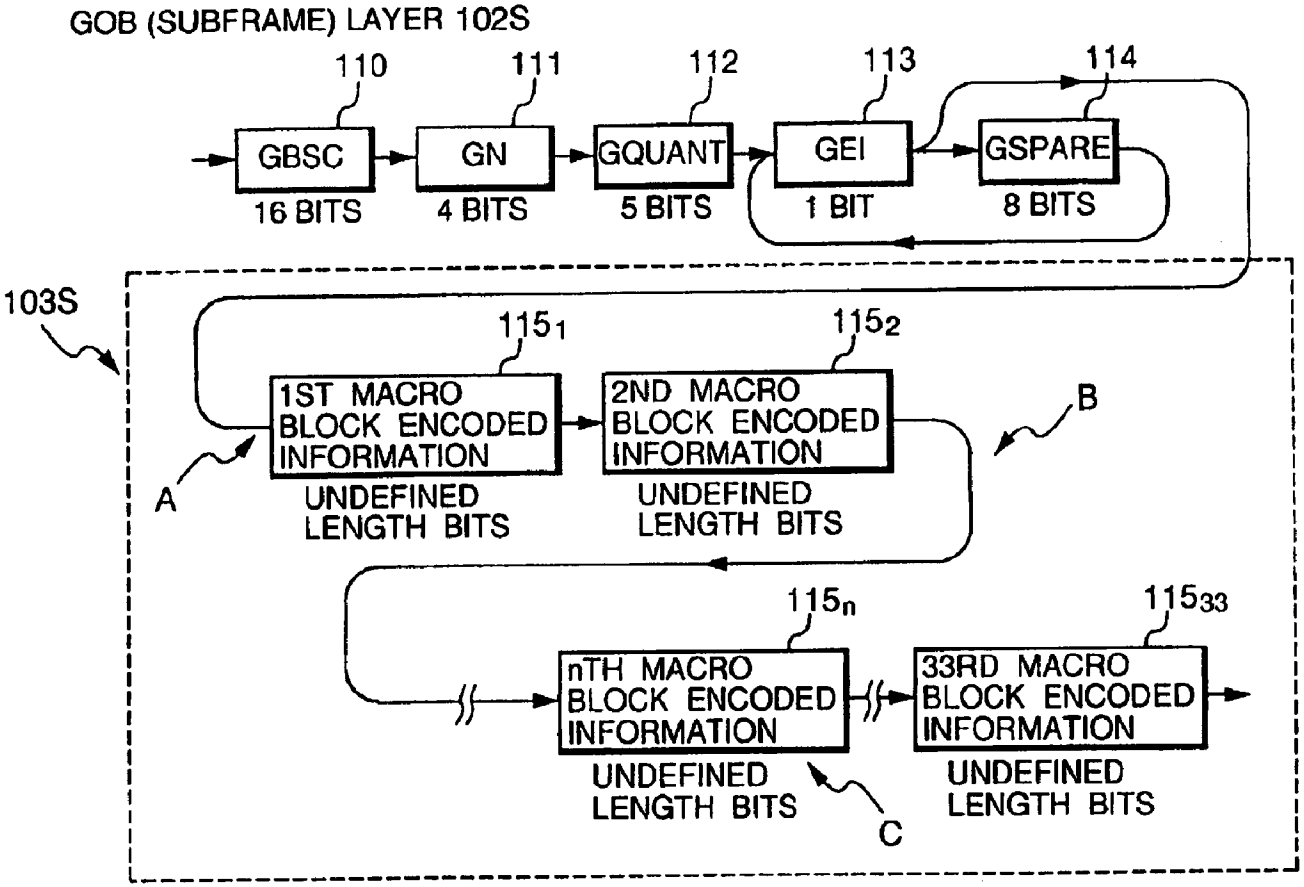
FIG. 3 PRIOR ART
FIG. 3 shows a GOB layer in the bit stream in FIG. 2 generated in the general encoding method for encoding moving picture signals.
Figure 4:
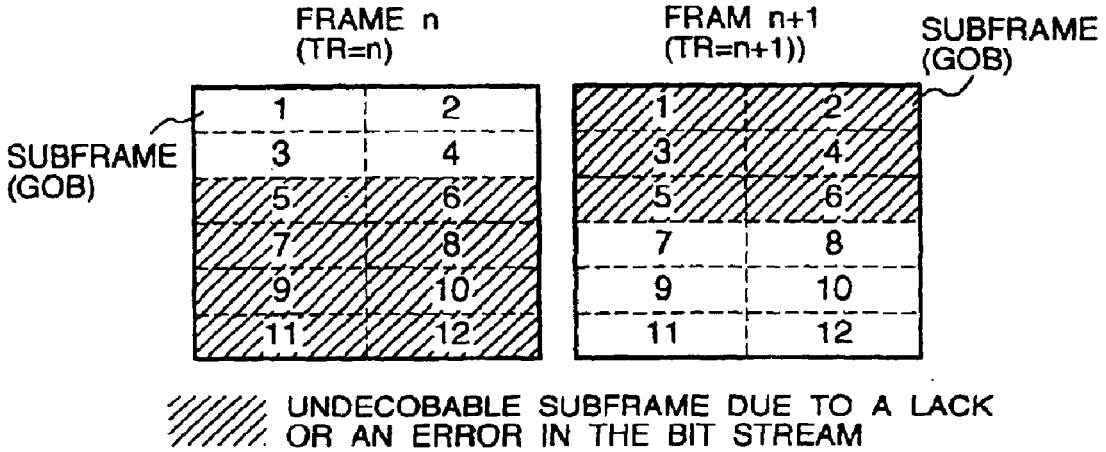
FIG. 4 PRIOR ART
FIG. 4 illustrates an effect of a lack or an error of a part of a bit stream occurring in the general encoding and decoding method for encoding and decoding moving picture signals.
Figure 5:
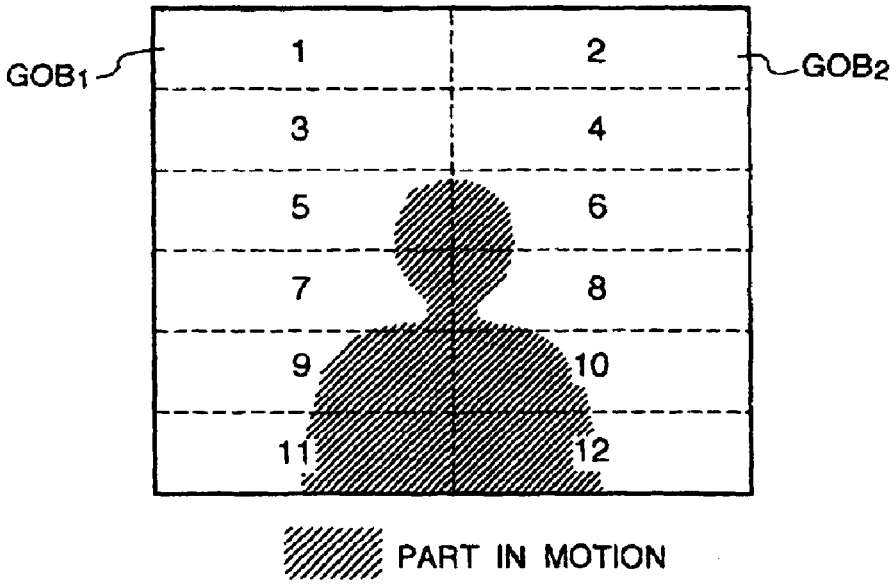
FIG. 5 PRIOR ART
FIG. 5 illustrates an effect of a lack or an error of a part of a bit stream occurring in the general encoding and decoding method for encoding and decoding moving picture signals.

Hereinafter, description will be made of embodiments according to the present invention referring to the drawings.

A method for encoding and decoding digital moving picture signals according to a first embodiment will be now described, which may correctly decode a subframe as a unit in relation to time even if a part of a bit stream is missing or an error occurs therein.

In the encoding method according to this embodiment, one frame of digital motion picture signals is composed of, for example, 352×288 pixels. The frame is divided into twelve subframes each composed of, for example, 176×48 pixels. Further, the subframe is divided into thirty three blocks 13 each composed of, for example, 16×16 pixels.

Figure 6:
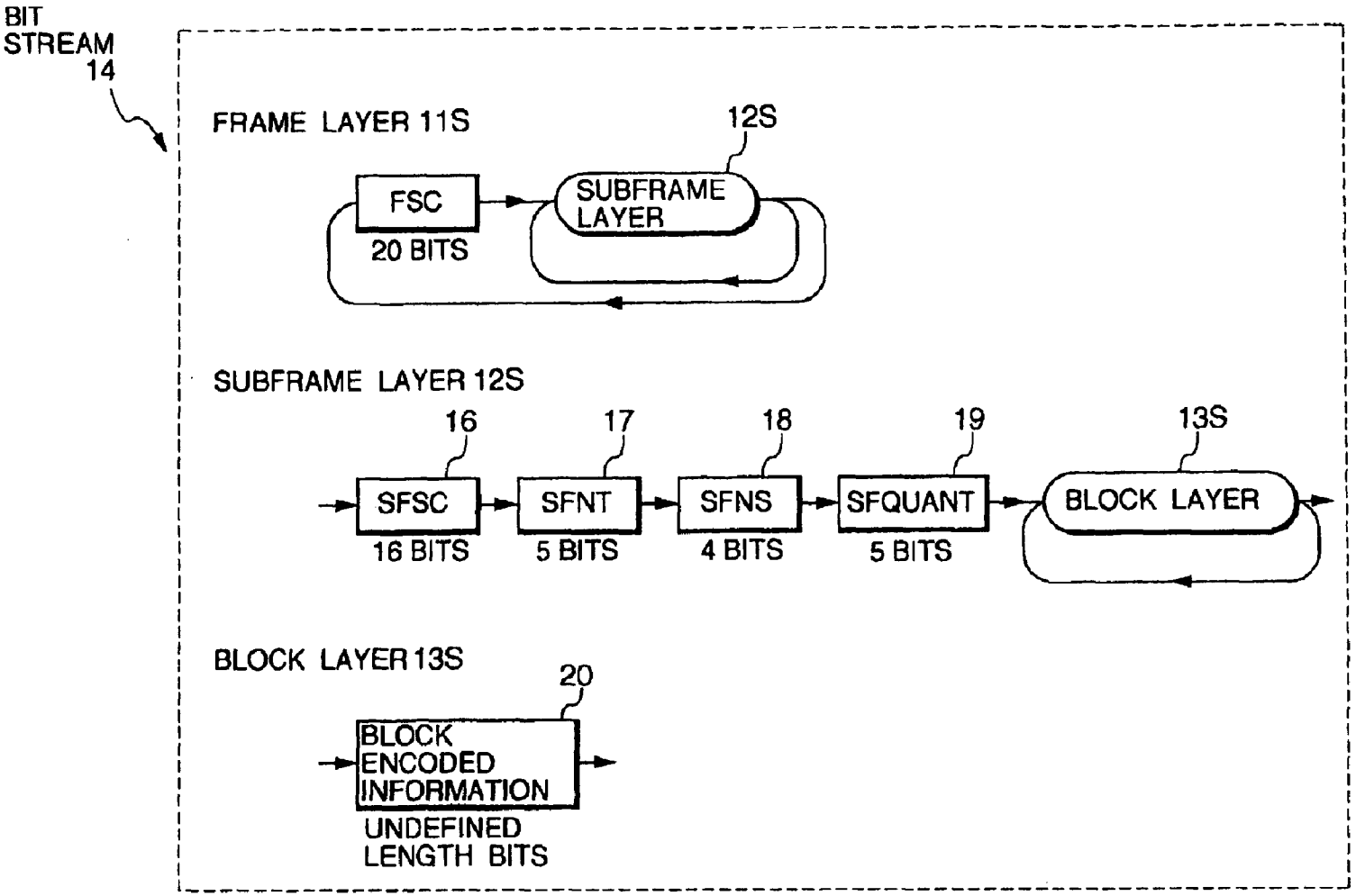
FIG. 6 shows a bit stream generated in a method for encoding digital moving picture signals according to first and second embodiments of this invention.

The encoding method according to this embodiment corresponds encoded information for one frame to a spatial hierarchical structure made up of a frame 11, subframes 12 and blocks 13 to generate a bit stream 14 as shown, for example, in FIG. 6.

Meanings of encoded information of each layer shown in FIG. 6 are given below: Frame layer 11S FSC (20 bits): a frame identifier 15; a unique code by which a decoding method can be always identified, expressed as "0000 0000 0000 0001 0000";

Subframe Layer 12S

SFSC (16 bits): a subframe identifier 16; a unique code by which a decoding method can be always identified, expressed as "0000 0000 0000 0001";

SFNT (5 bits): a subframe time number 17; indicating a time position in which this subframe 12 should be displayed;

SFNS (b 4bits): a subframe space number 18; indicating a spatial position in which the subframe 12 should be displayed;

SFQUANT (5 bits): quantization characteristic information 19; representing a quantization characteristic when a block 13 in the subframe 12 is encoded.

Incidentally, encoded information 20 in the block layer 13S which is the lowest hierarchy in FIG. 6 is generated in an encoding method of motion detection, prediction, orthogonal transform, quantization, variable length coding, etc., whose coding bit number are not fixed.

Figure 7:
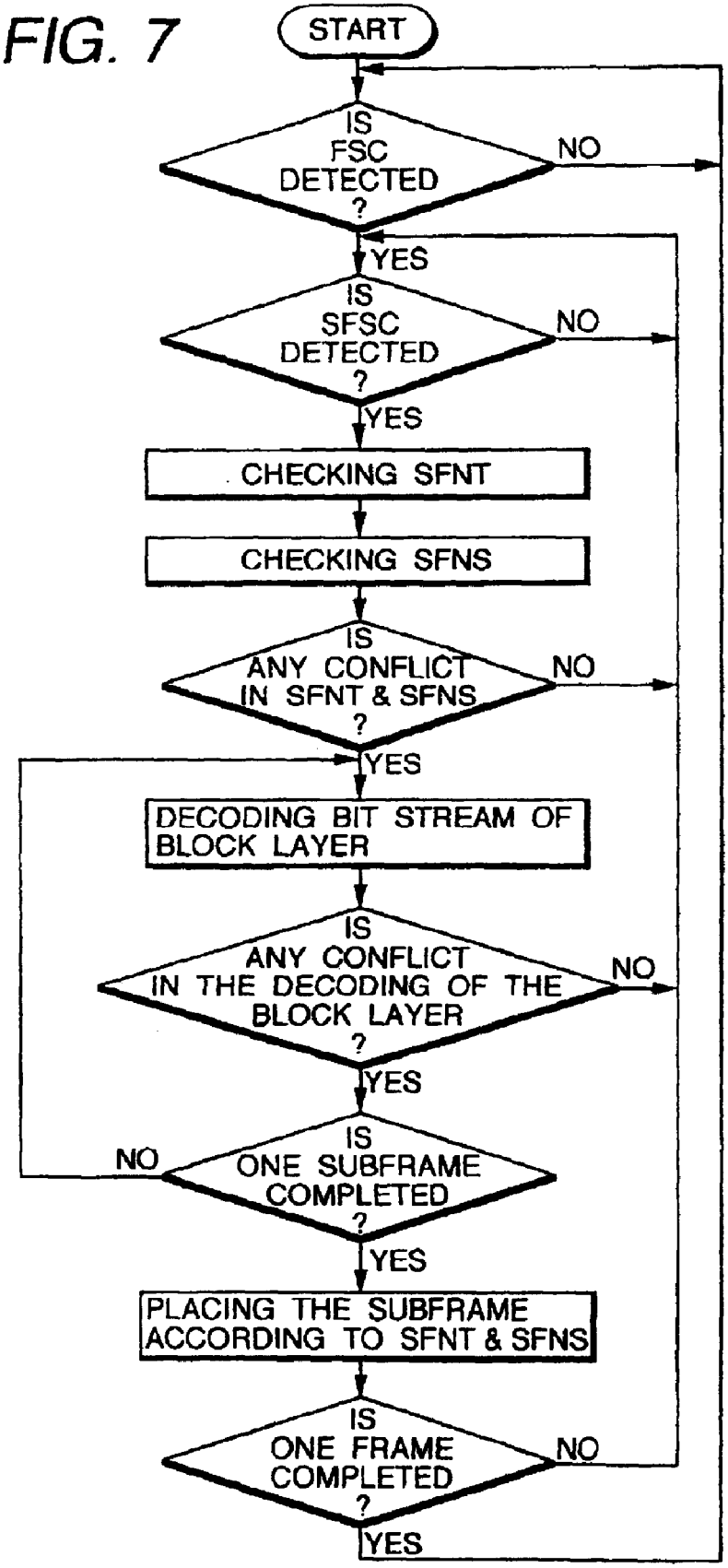
FIG. 7 is a flowchart illustrating the method for decoding digital moving picture signals according to the first embodiment of this invention.

Now referring to FIG. 7, a decoding method according to this embodiment will be now described. First, an FSC 15 which is an identifier of a frame layer 11S is found out from a bit stream 14 to establish synchronization of the frame layer 11S.

After the establishment of synchronization of the frame layer 11S, an SFSC 16 which is an identifier of a subframe layer 12S is found out from the following bit stream 14 to establish synchronization of the subframe layer 12S. Then a subframe time number SFNT 17 and a subframe space number SFNS 18 following the SFSC 16 are examined. Next, a bit stream 14 of a block layer 13S is decoded. A method for decoding this block layer 13S is a procedure to regenerate the block in processes of, for example, variable length decoding, reverse quantization, reverse orthogonal transform, motion compensation, etc. Finally, the subframe 12 which is a set of the regenerated blocks 13 is placed in time and space positions instructed by the SFNT 17 and the SFNS 18. If synchronization of the decoding is lost due to a lack of a part of the bit stream 14 or an error therein, a seek for the SFSC 16 which is an identifier of the subframe layer 12S is started. A lack [or an error of] *of a portion of, or an error in*, the bit stream 14 can be detected from, for example, that a decoded value exceeds a range specified in advance or an unexpected code word appears when the bit stream 14 is decoded. When the SFSC 16 is detected and synchronization of the subframe layer 12S is established, the SFNT 17 and the SFNS 18 are examined as stated above, the block layer 13S is decoded and regenerated, and the subframe 12 which is a set of the regenerated blocks 13 is placed in time and space positions instructed by the SFNT 17 and the SFNS 18.

According to the first embodiment of this invention, if a part of the bit stream 14 [lacks] *is lacking* or an error occurs in the bit stream 14, synchronization of the decoding is lost and the decoding becomes unfeasible, but correct decoding becomes possible immediately after a subframe 12 in trouble.

As having been described the above first embodiment by way of an example, it is alternatively possible that the frame 11, the subframe 12 and the block are in different sizes and shapes. A bit length of each encoded information may be different from that of the above encoded information, or the frame layer 19 may be omitted, in addition.

According to a second embodiment of this invention, description will be now made of a method for encoding digital moving picture signals which can suppress degradation of a reproduced picture to a small extent if a subframe including a picture moving in relation to time cannot be decoded. Incidentally, it is possible here to employ a decoding method similar to that of the first embodiment.

In the encoding method of this embodiment, one frame 11 of digital moving picture signals is composed of, for example, 352×288 pixels. The frame 11 is divided into blocks each composed of 16×16 pixels. In other words, one frame 11 is composed of 22 blocks×18 block lines 21. The block line 21 corresponds to the subframe 12 mentioned above.

Figure 8:
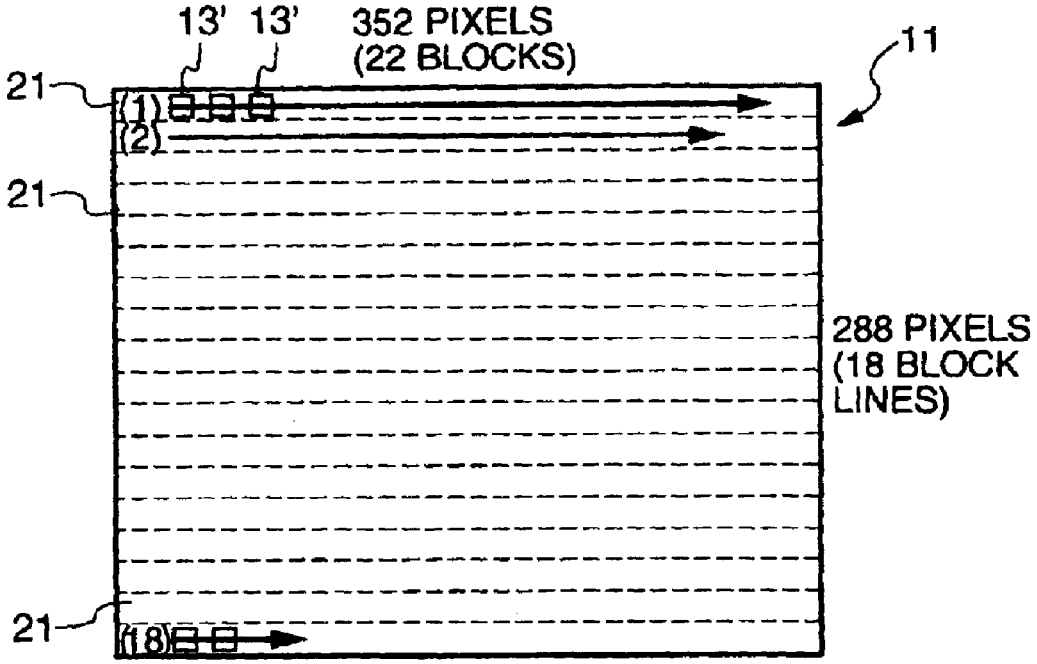
FIG. 8 illustrates the method for encoding digital moving picture signals according to the second embodiment of this invention.

In the encoding method of this embodiment, each block 13' is encoded from the uppermost block line 21, as shown in FIG. 8, to generate encoded information. The encoded information of each block 13' is generated in an encoding method of, for example, motion detection, prediction, orthogonal transform, quantization, variable length coding, etc., the number of coding bits of which is not fixed. More specifically, the number of coding bits of a block 13' which is difficult to be encoded is large, whereas the number of coding bits of a block 13' which is easy to be encoded is small. In the encoding method of this embodiment, a set of blocks 13 or 13' composes a subframe 12 (or a block line 21) which is a unit of encoding, but the number of blocks 13 or 13' included in one subframe 12 or 12' is not fixed.

A manner of generating a bit stream 14 in the encoding method of this embodiment and a structure of a subframe layer 12S will be now described with reference to FIG. 6. When one frame is encoded, an identifier of a frame layer is encoded, and an FSC 15 is placed in a bit stream 14. Next, the identifier of the subframe layer 12S, a time number and a space number of that subframe, and a quantization characteristic of that subframe are encoded together, and code words of an SFSC 16, an SFNT 17, an SFNS 18 and an SFQUANT 19 are placed in the bit stream 14. At the same time, block encoding bit number integrated value B-add is set to zero. Following that, a block 13 is encoded and encoded information of the block 13 composed of variable codes is placed in the bit stream 14. Concurrently, the coding bit number B of this block 13 is added to B-add. Namely, an equation, B-add=B-add+B, is computed. Similarly, blocks 13 are encoded successively, encoded information 20 of each block 13 is placed in the bit stream 14, and a calculation of B-add=B-add+B is repeated each time. If the B-add exceeds a subframe interval SFd when encoding of a certain block 12 is completed, an identifier of the subframe, a time number and a space number of that subframe and a quantization characteristic of that subframe are encoded, and code words of an SFSC 16, and SFNT 17, an SFNS and an SFQUANT 19 are placed in the bit stream 14. At the same time, a block coding bit integrated value B-add is set to zero. In other words, a new subframe layer 12S is started to be formed from that point.

The subframe interval SFd is set to, for example, 540 bits. Therefore, if one frame is encoded with, for example, 6400 bits in the encoding method of this embodiment, 12 subframes 12 exist in one frame since 6400/540=11.85.

Figure 9:
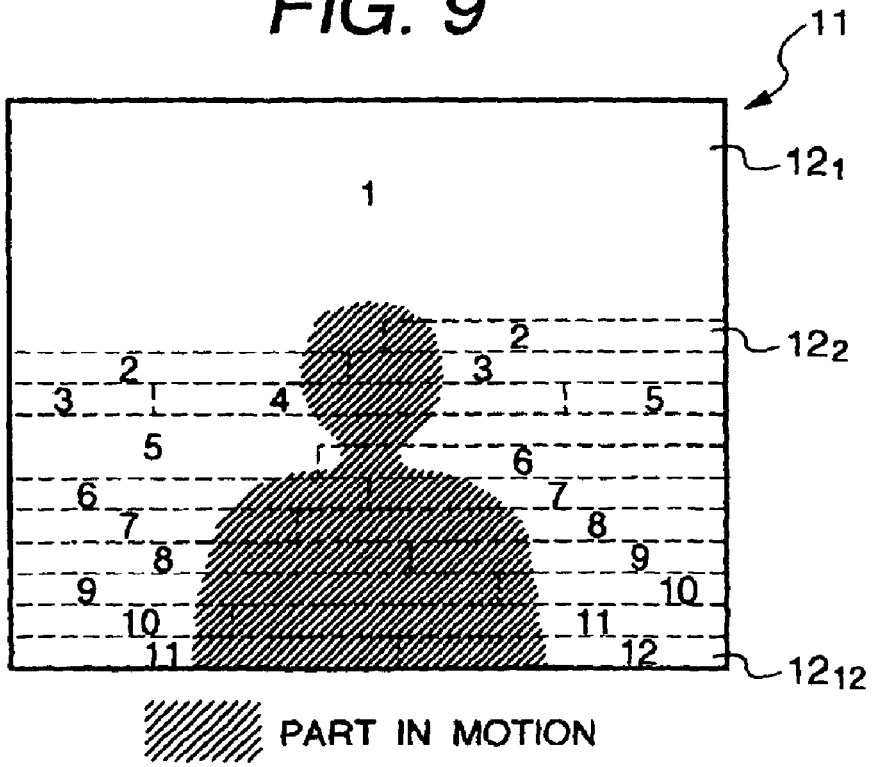
FIG. 9 shows a structure of subframes according to the second embodiment of this invention.

In the encoding method according to this embodiment, the number of blocks 13 included in a subframe 12 is varied according to a quantity of generated information of the blocks included in one subframe, thereby varying a spatial size of the subframe 12, as stated above. More specifically, a subframe 12 including a block which is difficult to be encoded becomes small, whereas a subframe 12 including a block 13 which is easy to be encoded becomes large. FIG. 9 shows an example of a structure of subframes formed in the encoding method of this embodiment.

According to [th e] *the* second embodiment of this invention, a subframe 12 including a block 13 which contains a motion in relation to time, and is thus difficult to be coded is made smaller in relation to space. If such subframe 12 cannot be decoded, it is possible to suppress degradation of a quality of a reproduced picture to a small extent. In a region within a frame in which no motion in relation to time exists and degradation of the picture quality is hardly detected even if the decoding is unfeasible, a size of one subframe is large in relation to space, which allows a less volume of side information such as the subframe identifier SFSC 16, subframe number SFNT 16 and subframe number SFNT 17. This can prevent an encoding efficiency from being lowered.

As having been described the second embodiment by way of an example, it is alternatively possible that the frame 11, subframe 12 and the block 13 are in different sizes and shapes. It is also possible to employ values of a quantity of codes of one frame and a subframe interval SFD different from those employed in the above example.

As obvious from the above embodiments, this invention enables correct decoding of each subframe 12 an a unit in relation to time even if a part of the bit stream 14 is missing or an error occurs therein.

Further, according to this invention, it is possible to suppress degradation of a quality of the reproduced picture to a small extent if a subframe 13 including a block which is in motion in relation to time cannot be decoded.

Still further, in a region within a frame in which no motion in relation to time exists and degradation of a quality of the reproduced picture quality is hardly detected even if the decoding in unfeasible, side information of the region is allowed to be in a small volume so that it is possible to prevent an encoding efficiency from being lowered.

What is claimed is:

[1. A method for encoding digital motion picture signals of a frame, comprising the steps of:

dividing said frame into plural blocks each including N×M pixels;

forming a subframe composed of a set of said blocks, said subframe being a unit to be encoded;

setting an identifier to said subframe to identify said subframe; and specifying a frame to which said subframe belongs by adding to said identifier time position information to said identifier representing an order of displaying said subframe;

encoding said time position information along with said subframe, and multiplexing said encoded time position information and a bit stream of said encoded subframe to transmit said encoded time position information and said bit stream.]

[2. A method for encoding digital motion picture signals of a frame, comprising the steps of:

dividing said frame into plural blocks each including N×M pixels;

forming a subframe composed of a set of said blocks, said subframe being a unit to be encoded; and varying the number of said blocks included in said subframe according to a quantity of information generated by encoding each block to vary a spatial size of each of said subframes included in each frame.]

[3. A method for encoding digital motion picture signals of a frame, comprising the steps of:

dividing said frame into plural blocks each including N×M pixels.

forming a subframe composed of a set of said blocks, said subframe being a unit to be encoded;

setting an identifier to said subframe to identify said subframe;

specifying a frame to which said subframe belongs by adding to said identifier time position information representing an order of displaying said subframe;

encoding said time position information along with said subframe, and multiplexing said encoded time position information and a bit stream of said encoded subframe to transmit said encoded time position information and said bit stream; and varying the number of said blocks included in said subframe according to a quantity of information generated by encoding each block to vary a spatial size of each of said subframes included in each frame.]

[4. The method for encoding digital motion picture signals of a frame according to claim 2, wherein each of said subframes included in said frame has an equal sum of quantities of generated information of said blocks included in said subframe.]

[5. The method for encoding digital motion picture signals of a frame according to claim 3, wherein each of said subframes included in said frame has an equal sum of quantities of generated information of said blocks included in said subframe.]

[6. A method for encoding and decoding digital motion picture signals of a frame, comprising the steps of:

dividing said frame into plural blocks each including N×M pixels;

forming a subframe composed of a set of said blocks, said subframe being a unit to be encoded;

setting an identifier to said subframe to identify said subframe;

specifying a frame to which said subframe belongs by adding to said identifier time position information representing an order of displaying said subframe;

encoding said time position information along with said subframe;

multiplexing said encoded time position information and a bit stream of said encoded subframe to transmit said encoded time position information and said bit stream; and decoding each of said subframes appropriately in relation to time by decoding and using said time position information to form said frame of said digital moving picture signals.]

[7. A method for encoding and decoding digital motion picture signals of a frame, comprising the steps of:

dividing said frame into plural blocks each including N×M pixels;

forming a subframe composed of a set of said blocks, said subframe being a unit to be encoded;

varying the number of said blocks included in said subframe according to a quantity of information generated by encoding each block to vary a spatial size of each of said subframes included in each frame; and decoding each of said subframes to form said frame of said digital moving picture signal.]

[8. A method for encoding and decoding digital motion picture signals of a frame, comprising the steps of:

dividing said frame into plural blocks each including N×M pixels;

forming a subframe composed of a set of said blocks, said subframe being a unit to be encoded, setting an identifier to said subframe to identify said subframe;

specifying a frame to which said subframe belongs by adding to said identifier time position information representing an order of displaying said subframe;

encoding said time position information along with said subframe;

multiplexing said encoded time position information and a bit stream of said encoded subframe to transmit said encoded time position information and said bit stream;

varying the number of said blocks included in said subframe according to a quantity of information generated by encoding each block to vary a spatial size of each of said subframes included in each frame; and decoding said subframe appropriately in relation to time by decoding and using said time position information to form said frame of said digital moving picture signal.]

[9. The method for encoding and decoding digital motion picture signals of a frame according to claim 7, wherein each of said subframes included in said frame has an equal sum of quantities of generated information of said blocks included in said subframe.]

[10. The method for encoding and decoding digital motion picture signals of a frame according to claim 8, wherein each of said subframes included in said frame has an equal sum of quantities of generated information of said blocks included in said subframe.]

[11. The method for encoding digital motion picture signals of a frame according to claim 1, wherein said step of adding time position information comprises adding the time information to each subframe of said frame.]

[12. The method for encoding digital motion picture signals of a frame according to claim 11, further comprising the step of maintaining substantially constant a quantity of information generated for each subframe within said frame thereby to vary spatial dimensions represented by each said subframe.]

[13. The method for encoding digital motion picture signals of a frame according to claim 1, further comprising the step of maintaining substantially constant a quantity of information generated for each subframe within said frame thereby to vary spatial dimensions represented by each said subframe.]

[14. The method for encoding and decoding digital motion picture signals of a frame according to claim 6, wherein said step of adding time position information comprises adding the time information to each subframe of said frame.]

[15. The method for encoding digital motion picture signals of a frame according to claim 14, further comprising the step of maintaining substantially constant a quantity of information generated for each subframe within said frame thereby to vary spatial dimensions represented by each said subframe.]

[16. The method for encoding digital motion picture signals of a frame according to claim 6, further comprising the step of maintaining substantially constant a quantity of information generated for each subframe within said frame thereby to vary spatial dimensions represented by each said subframe.]

*17. A method for encoding digital motion picture signals of a frame, comprising:*

*dividing said frame into plural blocks each including N×M pixels;*

*forming a subframe composed of at least one of said blocks, said subframe being a unit to be encoded;*

*setting an identifier to said subframe to identify said subframe;*

*specifying a frame to which said subframe belongs by adding time position information to said identifier, the time position information representing an order of displaying said subframe;*

*specifying a spatial position of said subframe within said frame by adding spatial position information to said identifier, the spatial position information representing said spatial position of said subframe within said frame;*

*encoding said time position information and said spatial position information along with said subframe, and*

*multiplexing said encoded time position information, said encoded spatial position information and a bit stream of said encoded subframe to transmit said encoded spatial position information, said encoded time position information and said bit stream.*

*18. A method for encoding and decoding digital motion picture signals of a frame, said method comprising:*

*dividing said frame into plural blocks each including N×M pixels;*

*forming a subframe composed of at least one of said blocks, said subframe being a unit to be encoded;*

*setting an identifier to said subframe to identify said sub-frame;*

*specifying a frame to which said subframe belongs by adding time position information to said identifier, the time position information representing an order of displaying said subframe;*

*specifying a spatial position of said subframe within said frame by adding spatial position information to said identifier, the spatial position information representing said spatial position of said subframe within said frame;*

*encoding said time position information and said spatial position information along with said subframe;*

*multiplexing said encoded time position information, said encoded spatial position information and said encoded subframe to transmit said encoded spatial position information, said encoded time position information and said encoded subframe as an encoded bitstream;*

*receiving said encoded bitstream;*

*detecting said identifier to extract said encoded time position information and said encoded spatial position information from said encoded bitstream;*

*decoding said extracted encoded time position information to obtain decoded time position information;*

*decoding said extracted encoded spatial position information to obtain decoded spatial position information; and*

*decoding said encoded subframe to form said frame according to said decoded spatial position information and said decoded time position information.*

*19. A method for decoding an encoded bitstream, said method comprising:*

*(a) receiving said encoded bitstream containing an identifier, an encoded subframe obtained by encoding a subframe composed of at least one of said blocks, and an encoded spatial position information representing a spatial position of said subframe within a frame composed of a plurality of subframes and an encoded time position information representing an order of displaying said subframe,*

*wherein*

*said identifier is set to said encoded subframe to identify said subframe,*

*said encoded time position information is added to said identifier by specifying a frame to which said subframe belongs, and*

*said encoded spatial position information is added to said identifier by specifying a spatial position of said subframe within said frame;*

*(b) detecting said identifier to extract said encoded spatial position information and said encoded time position information from said encoded bitstream;*

(*c*) *decoding said extracted encoded time position information to obtain decoded time position information;*

(*d*) *decoding said extracted encoded spatial position information to obtain decoded spatial position information; and*

(*e*) *decoding said encoded subframe to form said frame according to said decoded spatial position information and said decoded time position information.*

*20. The method for decoding according to claim 19, wherein in the case any conflict is detected in at least one of the decoded time position information and the decoded spatial position information corresponding to current encoded subframe, a procedure of detecting said identifier is executed to establish synchronization of a subframe layer without decoding said current encoded subframe.*

*21. The method for decoding according to claim 19, wherein in the case any conflict is detected in a process of decoding a current block layer within said encoded subframe, a procedure of detecting said identifier is executed to establish synchronization of a subframe layer without decoding said current block layer.*

* * * * *